US007764296B2

(12) United States Patent
Leoni et al.

(10) Patent No.: US 7,764,296 B2
(45) Date of Patent: Jul. 27, 2010

(54) ELECTROGRAPHIC APPARATUS FOR FORMING A LATENT IMAGE ON AN IMAGING SURFACE

(75) Inventors: Napoloen J. Leoni, San Jose, CA (US); Omer Gila, Cupertino, CA (US); Michael H. Lee, San Jose, CA (US); Eric G. Hanson, Burlingame, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 11/830,694

(22) Filed: Jul. 30, 2007

(65) Prior Publication Data

US 2009/0033735 A1 Feb. 5, 2009

(51) Int. Cl.
*G01D 15/06* (2006.01)
*G03G 15/00* (2006.01)

(52) U.S. Cl. ........................ 347/112; 347/123; 347/120

(58) Field of Classification Search ................ 347/123, 347/127, 112, 120
See application file for complete search history.

(56) References Cited

U.S. PATENT DOCUMENTS

| | | | | | |
|---|---|---|---|---|---|
| 4,160,257 | A | * | 7/1979 | Carrish | 347/127 |
| 5,138,348 | A | * | 8/1992 | Hosaka et al. | 347/128 |
| 5,239,317 | A | * | 8/1993 | Hosaka et al. | 347/127 |
| 5,270,741 | A | * | 12/1993 | Hosaka et al. | 347/125 |
| 5,296,878 | A | * | 3/1994 | Hosaka et al. | 347/127 |
| 5,404,157 | A | * | 4/1995 | Hosaka et al. | 347/128 |
| 5,592,266 | A | | 1/1997 | Park et al. | |

FOREIGN PATENT DOCUMENTS

| | | |
|---|---|---|
| EP | 991262 A2 | 5/2000 |
| JP | 54039637 | 3/1979 |
| KR | 101999020320 | 3/1999 |

* cited by examiner

*Primary Examiner*—Huan H Tran

(57) ABSTRACT

A charge source is used to create a latent image on an imaging surface. A volume between the charge source and the imaging surface may be pressurized while the latent image is being created.

24 Claims, 6 Drawing Sheets

FIG. 5
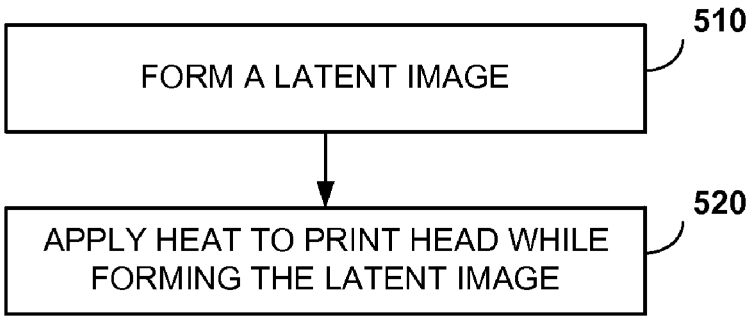
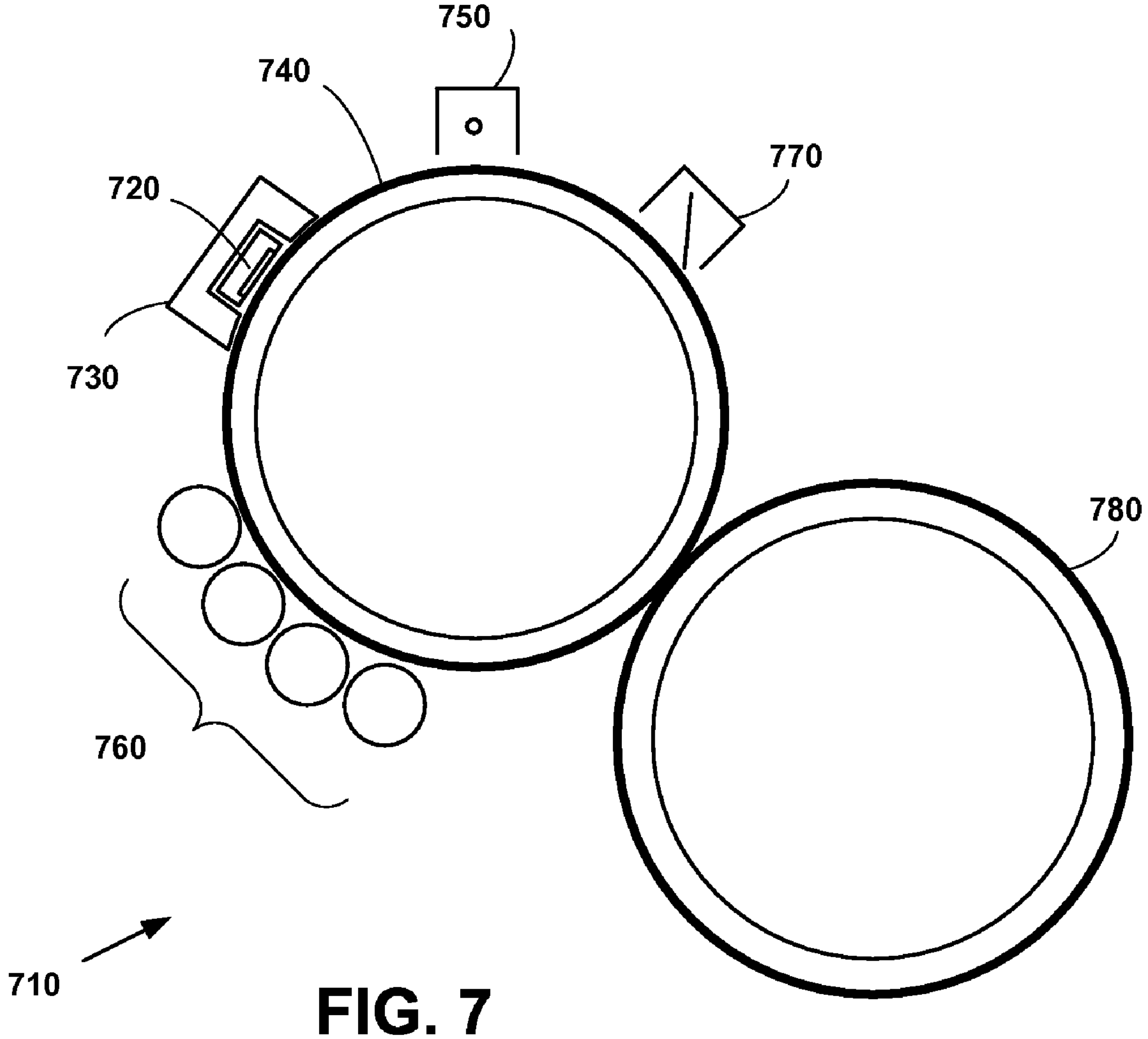
FIG. 7

ELECTROGRAPHIC APPARATUS FOR FORMING A LATENT IMAGE ON AN IMAGING SURFACE

BACKGROUND

Consider an electrographic printer that uses a charge source to form a latent image on an imaging surface. The charge source generates beams that form charges ("dots") at selected locations on the imaging surface. These dots make up the latent image.

During formation of the latent image, the charges already deposited on the imaging surface will repel the incoming charges, rendering the dot size larger than the diameter of the charge source beams. This problem, known as "blooming," can reduce image quality.

BRIEF DESCRIPTION OF THE DRAWINGS

FIG. 5 is an illustration of a method according to an embodiment of the present invention.

FIG. 7 is an illustration of a digital printing press according to an embodiment of the present invention.

DETAILED DESCRIPTION

Figure 1:
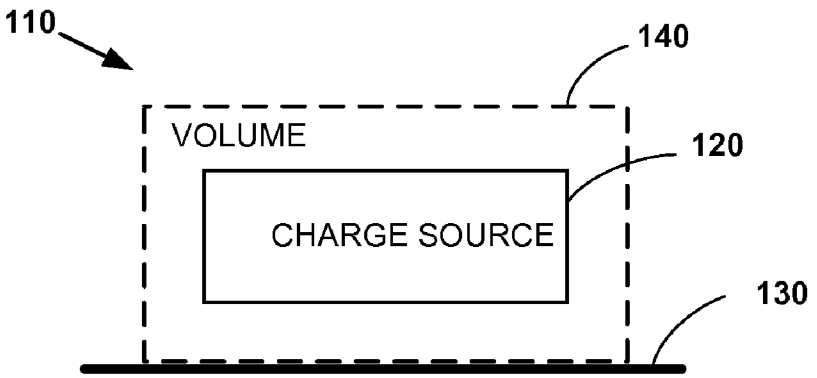
FIG. 1 is an illustration of an apparatus according to an embodiment of the present invention.

Reference is made to FIG. 1, which illustrates an electrographic apparatus 110 including a charge source 120 and an imaging surface 130. The charge source 120 provides charge beams that can form addressable dots on the imaging surface 130. The dots may be micrometer-sized. The imaging surface 130 may be provided by a layer of dielectric material.

The charge source 120 does not make contact with the imaging surface 130; therefore a gap exists between the charge source 120 and the imaging surface 130. A volume 140 contains at least this gap. The volume 140 may be larger and may also contain the charge source 120.

Figure 2:
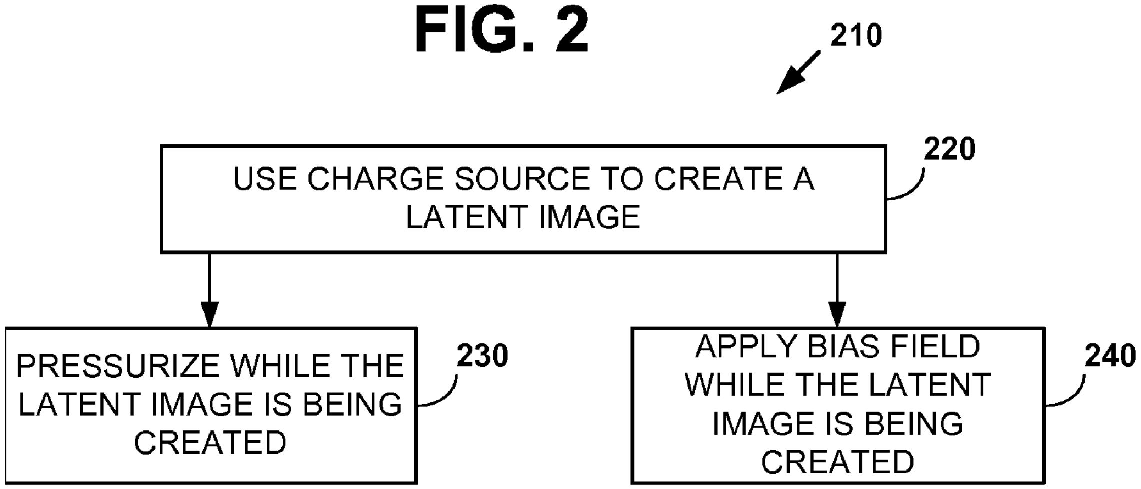
FIG. 2 is an illustration of a method according to an embodiment of the present invention.

Additional reference is made to FIG. 2, which illustrates a method 210 of using the electrographic apparatus 110. The method includes using the charge source 120 to create a latent image on the imaging surface 130 (block 220). To create a latent image, the charge source 120 emits an array of beams of charged species (e.g., electrons, ions) toward the imaging surface 130. The charged species follow electric field lines from the charge source to the imaging surface 130. In addition, a bias field is applied to straighten the electric field lines between the charge source 120 and the imaging surface 130.

The method further includes pressurizing the volume 140 while the latent image is being created (block 230). The volume 140 may be pressurized to at least $1/10^{th}$ of an atmosphere above atmospheric pressure. A range between 1/10 to 5 atmospheres above atmospheric pressure may be used. A narrower range of about 1-2 atmospheres above atmospheric may be used.

The volume 140 may be pressurized with a gas such as Nitrogen. However, air or an inert gas may be used.

In conventional electrographic printing, pressurizing the volume would be considered undesirable, since mobility and speed of the charged particles would be reduced. (If the mobility is reduced then the charge source current is decreased, so improvements in the charge source would have to be made to maintain the necessary charging current to create the latent image at process speeds.)

However, the applicants have found that a pressure above atmospheric pressure allows a higher bias field to be used during latent image creation without breakdown (block 240). Breakdown refers to spatially and temporally uncontrolled electrical currents, where random charges go to undesired locations on the imaging surface. The higher bias field, in turn, straightens the electric field lines and forces the charged species to follow the field lines more closely. This, in turn, allows the charge source 120 to create a latent image with smaller dots.

The electrographic apparatus 110 can be used in an electrographic printer (e.g., a laser printer), any other device that forms a latent image, and any other application where charge needs to be deposited in a small spot.

Consider an electrographic printer that uses the apparatus 110 and method 210 to form a latent image. After the latent image is formed, the latent image is developed (e.g., a dry or liquid toner is applied to the latent image), and the developed image is transferred and fused onto a print substrate (e.g., a sheet of paper).

Figure 3:
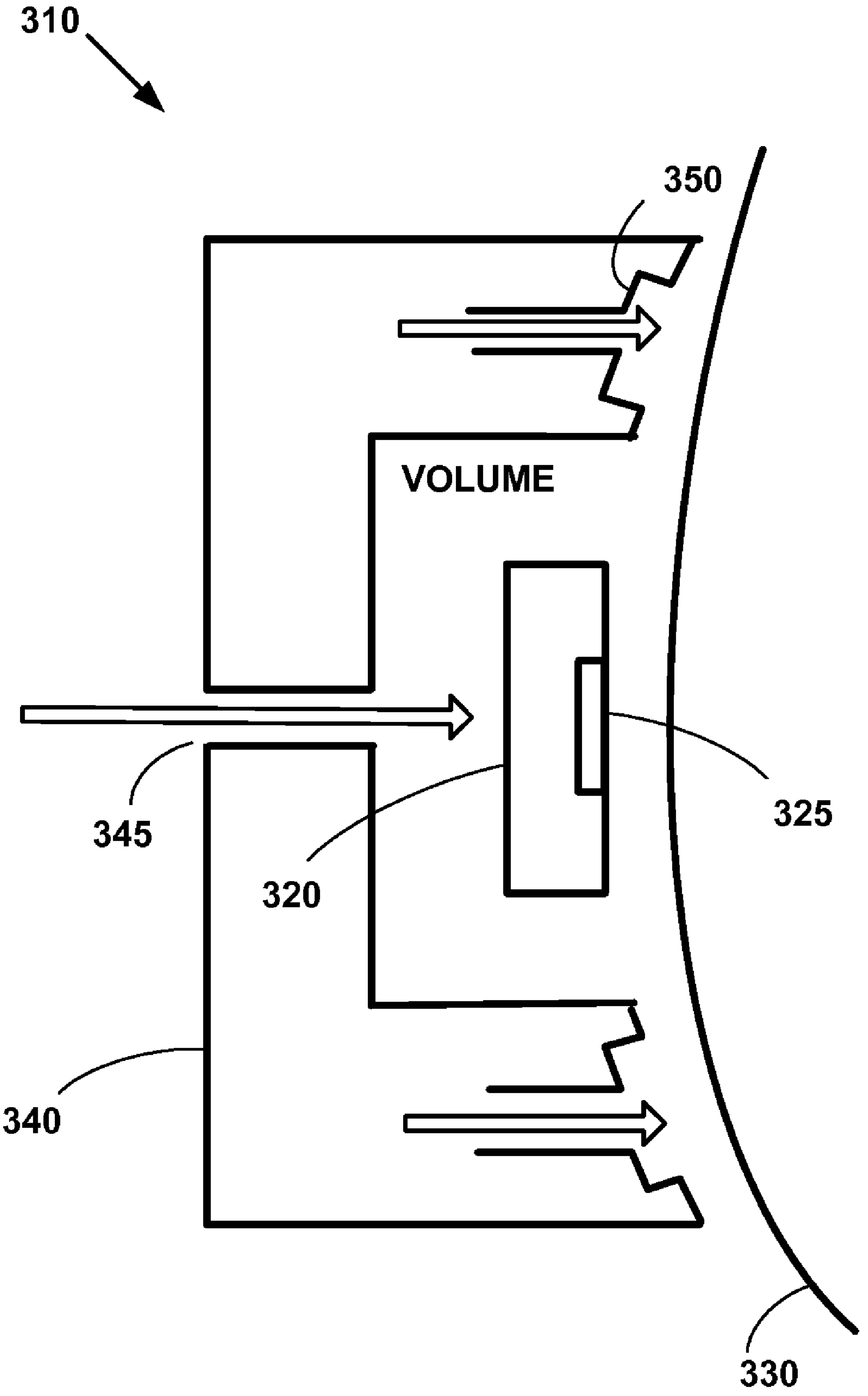
FIG. 3 is an illustration of an apparatus according to an embodiment of the present invention.

Reference is now made to FIG. 3, which illustrates an apparatus 310 for electrographic printing. The apparatus 310 includes a charge-emitting print head 320 and an imaging surface 330. The charge-emitting print head 320 includes an array of nozzles 325. The imaging surface 330 may be provided by a conductive drum that is coated with a dielectric material. However, the imaging surface 330 is not so limited. The imaging surface may be provided by some other structure. Two other exemplary structures include a dielectric belt with a ground plane, and a rigid or flexible plate.

The charge-emitting print head 320 may be an RF print head. An exemplary RF excited charge print head is disclosed in assignee's U.S. Ser. No. 11/699,720 filed Jan. 29, 2007 (the print head includes a screen or bias electrode for providing a bias field that focuses a charge beam, and it provides for a controlled discharge gap that can be tailored and optimized for a specific operating pressure). Another exemplary charge source is disclosed in US Patent Application No. 2006/0050132. The print head 320 is not limited to an RF print head. Other sources of charged species (e.g., ion, electron) may be used.

The print head 320 is partially enclosed in a housing 340. The housing 340 includes a pressurized gas port 345 for admitting pressurized gas to the volume containing the print head 320.

The distance between the print head 320 and the imaging surface 330 is a function of mechanical tolerances. A bearing arrangement may be used to maintain a gap between the print head 320 and the imaging surface 330. Mechanical bearers (e.g. hard steel rollers) or sliding guides on the side could be used to set the distance between the array of nozzles 325 and the imaging surface 330.

As an alternative, gas bearings 350 may be used to maintain the gap between the print head 320 and the imaging surface 330. A preload on the gas bearing 350 may be combined with the inside pressure and geometrical design to set the gap at which the bearing operates. A mechanical stop may be used to prevent the print head 320 from rising beyond a certain dimension.

The gas bearings 350 may be integrated with the housing 340, as illustrated in FIG. 3. An added advantage of the gas bearings 350 is that they also provide a tight seal against the imaging surface 330.

The gas bearings may have their own supply of gas. The gas bearings 350 could even be supplied with air, while the volume within the housing 340 could be pressurized with a separate supply of nitrogen or air.

The electrographic printing apparatus 310 may include other stations that are not illustrated in FIG. 3. For instance, the electrographic printing apparatus 310 may include a station for developing the latent image, and a station for transferring and fusing the developed image onto a print medium. The electrographic printing apparatus 310 may also include a means for moving the print head 320 to fill the latent image one swath at a time.

Figure 4:
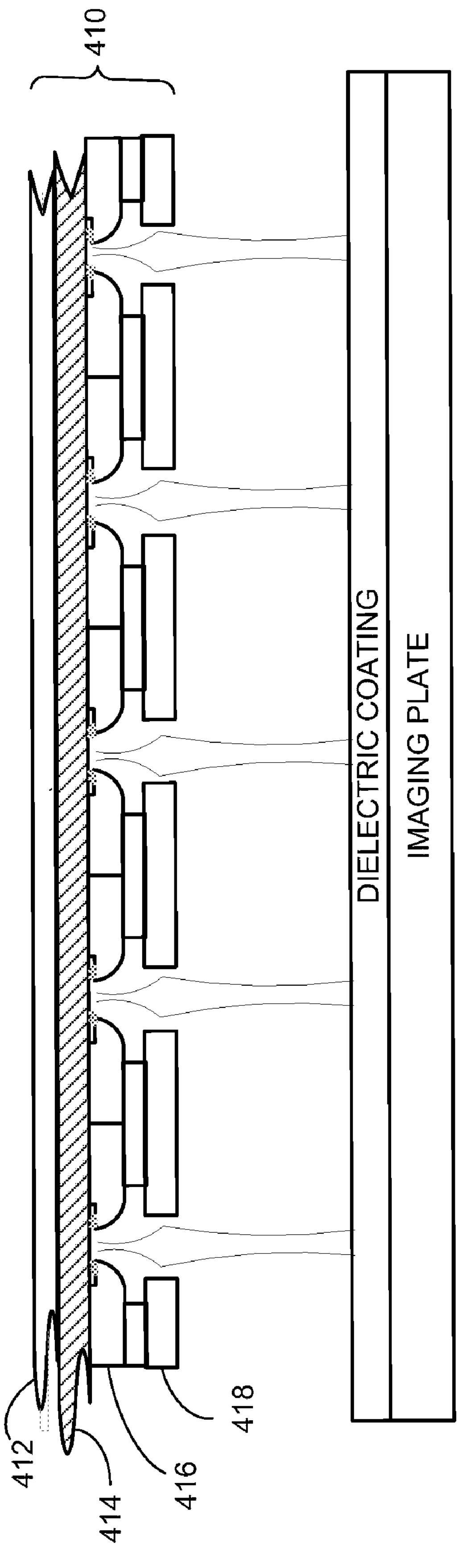
FIG. 4 is an illustration of an exemplary RF excited charge print head.

Reference is now made to FIG. 4, which illustrates an exemplary RF excited charge print head 410. The print head 410 includes a printed circuit board 412, a nozzle array 414, discharge electrodes 416 and screen or bias electrodes 418. The bias electrodes 418 are spaced apart from the imaging surface, which is formed by a dielectric coating on an imaging plate. The distance between the screen electrodes 418 and dielectric coating is referred to as the "spacing."

Figure 8:
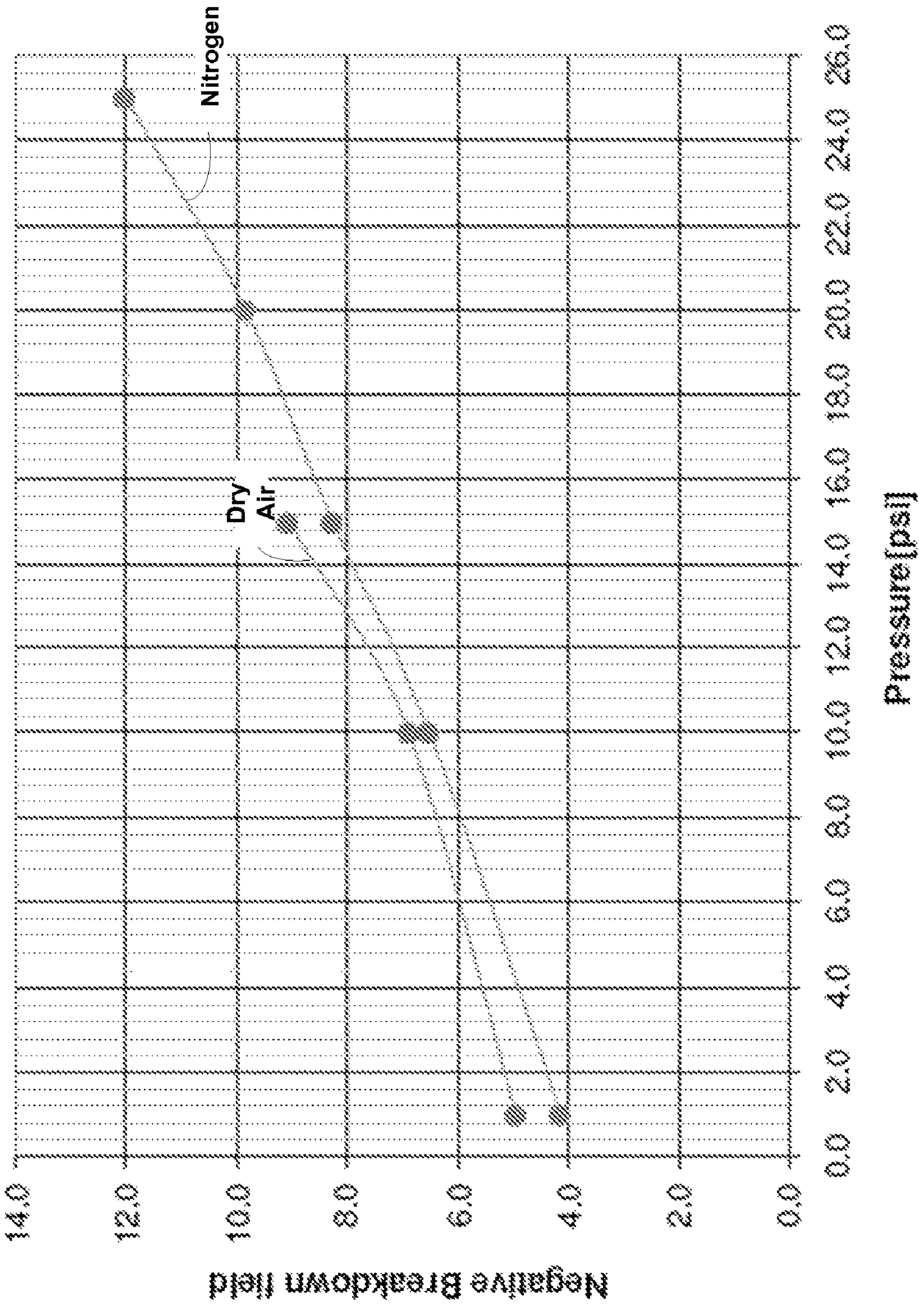
FIG. 8 is a plot of negative breakdown field versus pressure applied to a print head.

Reference is made to FIG. 8, which illustrates experimental data for negative breakdown field versus pressure for a print head such as the one illustrated in FIG. 4. Spacing is 250 microns. FIG. 8 indicates a linear increase in breakdown voltage between the bias electrode and the imaging plate when the pressure is increased above atmospheric. The bias field can be doubled at one atmosphere above atmospheric pressure, tripled at two atmospheres above atmospheric pressure, etc.

Consider an electrographic printing apparatus that that uses a charge-emitting print head to form latent images and liquid toner to develop the latent images. If oil vapors from the liquid toner surround the print head (the oil vapors result from the evaporation of carrier oil component of the liquid toner), the oil vapors can contaminate the print head. As a result, the nozzles will become clogged in a non-uniform way. Over time, current will diminish until the print head produces no output. Thus, the clogging will shorten the life of the print head, which will result in a higher cost per print unit.

Reference is now made to FIG. 5. To overcome this problem, the print head may be heated (block 520) while forming the latent image (block 510) to prevent contamination by oil vapors. The print head may be heated to a temperature above the dew point of the oil vapors. In some embodiments, the print head may be heated by a heating element. In other embodiments, the print head may be heated by the same gas that pressurizes the print head.

The print head may be heated whenever it is on. The print head may also be heated while exposed to the oil vapors (which can occur while the print head is off) to prevent the oil vapors from condensing and forming deposits on the nozzles.

Figure 6:
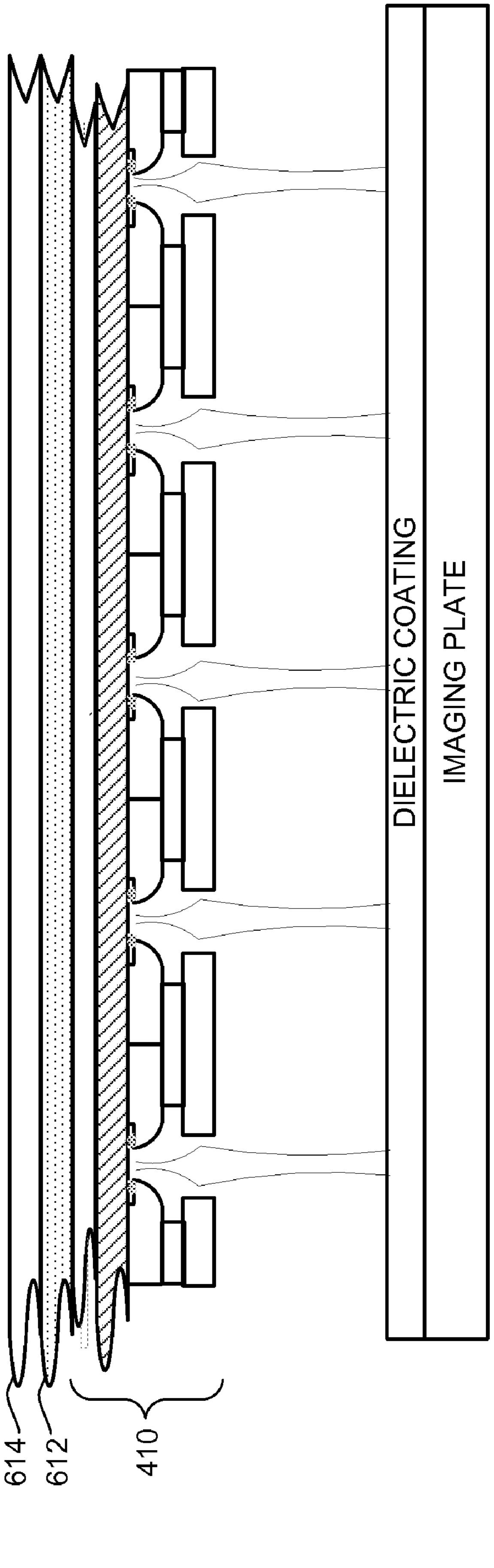
FIG. 6 is an illustration of a print head according to an embodiment of the present invention.

Reference is now made to FIG. 6, which illustrates an example of how the print head 410 of FIG. 4 may be heated. The print head 410 is mounted on a heat sink 612 made of a good thermal conductor (e.g., aluminum), and a heater 614 is mounted on the heat sink 612. The heater 614 may be a resistive type heater such as a kapton heater. While the heater 614 is on, the nozzles are heated. The heat sink 612 maintains uniformity of the temperature across the width of the print head 610. The heating temperature may be controlled by a temperature sensor on the heat sink 612 and a closed loop control.

Reference is now made to FIG. 7, which illustrates a digital printing press 710. The digital printing press 710 includes a charge-emitting print head 720 with a housing 730 for forming a latent image in accordance with an embodiment of the present invention. Such a print head 720 and housing 730 is used instead of a laser writing system.

A conductive drum 740, coated with a hard and durable dielectric, provides an imaging surface. A typical thickness for this dielectric layer would be on the order of 20 micrometers for a relative dielectric constant of 3. Such a drum 740 is used instead of a photoconductor (PC) imaging element.

The digital printing press 710 also includes a charge erasing station 750 for bringing the imaging surface to a ground potential (e.g., close to zero volts). This station 750 may include an ac charge erasing device such as an AC-driven scorotron or an AC-driven charge roller.

The digital printing press 710 further includes a development station for producing a liquid toner image. The development station includes a plurality of conventional ink development units 760. The development station may also include a roller (not shown) for developing the ink. The roller and ink have opposite charges, whereby ink is pushed toward the latent image.

A cleaning station 770 cleans any ink that is left on the imaging surface. The cleaning station may include cleaning rollers and cleaning blades.

An intermediate member may be used to transfer the liquid toner image to a print medium. For example, a transfer drum 780 may be used to transfer and fuse the liquid toner image onto a surface of a print medium.

The housing 730 may be temperature-controlled so that the surfaces of the charge generating entities (e.g., nozzle array, and discharge and bias electrodes) are heated to a temperature that prevents any condensed oil from polymerizing and thereby turning into a clogging agent.

The digital printing press 710 offers superior print quality over conventional dry toner electrographic printers. Liquid toner has advantages over dry toner. By using a liquid carrier for the ink particles there are fewer issues of toner scattering due to the aerodynamic forces that increase as the printing speed increases, thereby enabling the use of smaller particles. Using smaller ink particles is also advantageous because thinner material layers can be placed on top of the print media, thereby reducing cost of materials and producing prints that better resemble the gloss of the media.

Print quality of the digital printing press 710 is closer to print quality of conventional digital printing presses. Because the problem with blooming is reduced, dot sizes in the latent image approach those produced by a conventional laser writing system and photoconductor imaging element.

The digital printing press 710 offers certain advantages over a conventional digital printing press. The charge-emitting print head 720 is less expensive than a laser writing assembly, and it can achieve higher scan speeds without introducing any additional problems. Scanning a laser at required line widths calls for very high rotational speeds for a rotating mirror. These high rotation speeds create problems such as deformations of the mirror faces and susceptibility to dynamic disturbances.

Using a charge source instead of a laser writing system also allows the photoconductor imaging element to be replaced by the dielectric-coated imaging drum 740. The dielectric coating of the drum 740 is more durable than the photoconductor imaging element and has a far longer operating life. This can significantly reduce the cost per printed page.

The invention claimed is:

1. A method comprising:

using a charge source to create a latent image on an imaging surface;

pressurizing a volume between the source and the imaging surface while the latent image is being created; and applying a bias field to straighten electric field lines between the charge source and the imaging surface while the latent image is being created, the bias field having a linear relationship to the pressure above atmospheric pressure.

2. The method of claim 1, wherein the volume is pressurized in the range of 1/10 to 5 atmospheres above atmospheric pressure.

3. The method of claim 1, wherein the volume is pressurized to about 1-2 atmospheres above atmospheric pressure.

4. The method of claim 1, wherein a Nitrogen gas is used to pressurize the volume.

5. The method of claim 1, further comprising heating the charge source while creating the latent image to prevent contamination of the charge source from oil vapors.

6. The method of claim 5, wherein the volume also contains the charge source; wherein oil vapors from a liquid toner surround the charge source; and wherein the charge source is heated above the dew point of the oil vapors.

7. The method of claim 1, wherein the charge source forms the latent image with an array of charge beams.

8. The method of claim 1, wherein the act of pressuring comprises pressurizing the volume to a pressure at least 1/10$^{th}$ of an atmosphere above atmospheric pressure.

9. Apparatus comprising a print head for forming a latent image; and a housing for the print head, the housing having a pressurized gas inlet for allowing above-atmospheric pressure to be applied to nozzles of the print head during the formation of a latent image, the above-atmospheric pressure being at least one atmosphere above atmospheric pressure.

10. An electrographic apparatus comprising:

an imaging surface;

a charge source for creating a latent image on the imaging surface;

a housing for the charge source, the housing allowing a volume between the charge source and the imaging surface to be pressurized while the latent image is being created; and gas bearings for maintaining a gap between the charge source and the imaging surface, the gas bearings also creating a pressure seal to a gap between the print head and the imaging surface.

11. The apparatus of claim 10, wherein the charge source includes a charge-emitting print head; and wherein the volume also contains the print head.

12. The apparatus of claim 11, wherein the print head is an RF excited charge print head.

13. The apparatus of claim 10, further comprising means for applying a bias field to the print head to straighten the electric field lines between the print head and the imaging surface.

14. The apparatus of claim 10, wherein the imaging surface is a surface of a dielectric layer on a conducting substrate.

15. The apparatus of claim 10, wherein the housing allows the volume to be pressurized to a pressure at least 1/10$^{th}$ of an atmosphere above atmospheric pressure.

16. A digital printing press comprising:

a conductive drum for providing an imaging surface;

a charge-emitting print head for forming a latent image on the imaging surface, there being a gap between the print head and the imaging surface; and a housing for defining a volume that contains the print head and the gap, the housing allowing a gas to pressurize the gap during formation of the latent image to a pressure at least one atmosphere above atmospheric pressure.

17. The digital printing press of claim 16, further comprising a liquid toner development station.

18. Apparatus comprising:

an imaging surface;

a liquid toner development station;

a charge source proximate the imaging surface; and means for heating the charge source to prevent contamination due to liquid toner oil vapors.

19. The apparatus of claim 18, wherein the charge source includes an RF print head.

20. The apparatus of claim 18, wherein the charge source includes a corona-type source having a corona wire; and wherein at least one of gas and housing around the corona wire is heated.

21. A method comprising using a print head to form a latent image on an imaging surface;

developing the latent image with liquid toner; and heating the print head to prevent contamination due to oil vapors from the liquid toner.

22. Apparatus comprising:

an imaging surface;

a liquid toner development station;

a charge source proximate the imaging surface; and a heater to heat the charge source to prevent contamination due to liquid toner oil vapors.

23. The apparatus of claim 22, wherein the charge source includes an RF print head.

24. The apparatus of claim 22, wherein the charge source includes a corona-type source having a corona wire; and wherein at least one of gas and housing around the corona wire is heated.

* * * * *